(12) United States Patent  
Heo

(10) Patent No.: US 8,725,111 B2
(45) Date of Patent: May 13, 2014

(54) METHOD FOR SWITCHING A TELEMATICS COMMUNICATION

(75) Inventor: Sung Wook Heo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 928 days.

(21) Appl. No.: 12/344,737

(22) Filed: Dec. 29, 2008

(65) Prior Publication Data

US 2010/0015947 A1 Jan. 21, 2010

(30) Foreign Application Priority Data

Jul. 18, 2008 (KR) ........................ 10-2008-0070117

(51) Int. Cl.
*H04M 1/66* (2006.01)

(52) U.S. Cl.
USPC ............................. 455/410; 455/420; 455/345

(58) Field of Classification Search
USPC .................................................. 455/420, 345
See application file for complete search history.

(56) References Cited

U.S. PATENT DOCUMENTS

| | | | |
|---|---|---|---|
| 6,853,894 B1* | 2/2005 | Kolls | 701/29 |
| 7,245,905 B2 | 7/2007 | Kamdar et al. | |
| 7,254,398 B2 | 8/2007 | Patenaude | |
| 2003/0190030 A1* | 10/2003 | Alton | 379/219 |
| 2003/0232619 A1* | 12/2003 | Fraser | 455/420 |
| 2004/0198466 A1* | 10/2004 | Walby et al. | 455/574 |
| 2004/0203554 A1* | 10/2004 | Simon | 455/345 |
| 2005/0107132 A1* | 5/2005 | Kamdar et al. | 455/569.2 |
| 2008/0136611 A1* | 6/2008 | Benco et al. | 340/426.3 |

FOREIGN PATENT DOCUMENTS

| | | |
|---|---|---|
| JP | 2004-252645 | 9/2004 |
| KR | 10-2005-0069549 A | 7/2005 |
| KR | 10-2006-0012895 A | 2/2006 |
| KR | 10-2006-0029333 A | 4/2006 |
| KR | 10-20060080960 | 7/2006 |
| KR | 10-20070044659 | 4/2007 |
| KR | 10-2007-0073006 A | 7/2007 |

\* cited by examiner

*Primary Examiner* — Lester Kincaid
*Assistant Examiner* — Isaak R Jama
(74) *Attorney, Agent, or Firm* — Edwards Wildman Palmer LLP; Peter F. Corless

(57) ABSTRACT

A method for providing telematics communications is provided comprising: sending an ignition-on message to a switching server by a telematics device, when an ignition is turned on; sending a switching phone list to the telematics device by the switching server; sending to the switching server, by the telematics device, information about a mobile terminal that a driver or passenger selects from the switching phone list and an authentication number that the driver or passenger inputs; and sending a switching setting result to the mobile terminal by the switching server after performing user authentication by using the authentication number and performing switching setting to allow a telephone number assigned to the selected mobile terminal to be switched to that of the telematics device.

11 Claims, 3 Drawing Sheets

METHOD FOR SWITCHING A TELEMATICS COMMUNICATION

CROSS-REFERENCE TO RELATED APPLICATION

This application claims under 35 U.S.C. §119(a) the benefit of Korean Patent Application No. 10-2008-70117 filed Jul. 18, 2008, the entire contents of which are incorporated herein by reference.

BACKGROUND

The present invention relates to a method for providing wireless communications, more particularly, to a method for providing telematics communications, which allows the phone number of a driver's mobile terminal or terminals and that of vehicle telematics device to be switchable with a single network in common.

Telematics provides a vehicle with various services including the service of providing audio contents or video contents by decoding audio signals or video signals stored in various media such as cassette tape, CD, DVD or the like, the service of providing traffic information such as path guidance for the destination which is set during driving, and the service of providing the information of a vehicle to the telematics information center when an accident occurs.

For such telematics communication, conventionally, a driver should subscribe to a mobile communication network service for a telematics device as well as a mobile communication network service for a mobile terminal or terminals of his/her own, which would increase mobile communication service fees.

The above information disclosed in the Background section is only for enhancement of understanding of the background of the invention and, therefore, it may contain information that does not form the prior art that is already known in this country to a person of ordinary skill in the art.

SUMMARY

In one aspect, the present invention provides a method for providing telematics communications, the method comprising: sending an ignition-on message to a switching server by a telematics device, when an ignition is turned on; sending a switching phone list to the telematics device by the switching server; sending to the switching server, by the telematics device, information about a mobile terminal that a driver or passenger selects from the switching phone list and an authentication number that the driver or passenger inputs; and sending a switching setting result to the mobile terminal by the switching server after performing user authentication by using the authentication number and performing switching setting to allow a telephone number assigned to the selected mobile terminal to be switched to that of the telematics device.

In case the switching setting is completed, the telematics device may be able to provide voice call, SMS, and TCP services through the telephone number of the mobile terminal, while the mobile terminal may not be able to provide voice call service.

In an embodiment, the present methods may further comprising: sending a request for canceling the switching setting to the switching server, when the telematics device receives the request from a driver in the ignition-on state; and sending a switching cancellation result to the mobile terminal, after the switching server cancels switching setting.

In case the cancellation of the switching setting is completed, the mobile terminal may be able to provide voice call, SMS, and TCP services, while the telematics device may not able to provide voice call, SMS, and TCP services except for emergency.

In another embodiment, the present methods may further comprise: sending an ignition-off message to the switching server by the telematics device, when the ignition is turned off; sending to the telematics device by the switching server a message confirming that the switching setting needs to be canceled and receiving a response message from the telematics device; and canceling the switching setting by the switching server and sending a switching cancellation result to the mobile terminal.

In the present methods, preferably, the switching server generates and saves the switching phone list and information about the mobile terminal in advance.

In one aspect, the present invention provides a system for providing telematics communications, the system comprising: A system for providing telematics communications, the system comprising: a telematics device performing a wireless communication with a telematics information center; and a switching server sending a switching phone list to the telematics device when an ignition is turned on and performing switching setting to allow a telephone number assigned to a selected mobile terminal from the switching phone list to be switched to that of the telematics device.

In accordance with another embodiment of the invention, wherein the telematics device comprises: the system of claim 7, wherein the telematics device comprises: an input unit for inputting an authentication number and selecting the mobile terminal to be switched from the switching phone list; a wireless communication unit performing a wireless communication with the switching server and the telematics information center and transmitting a message associated with the ignition on/off of a vehicle and the authentication number to the switching server.

In accordance with another embodiment of the invention, wherein, in case the switching setting is completed, the telematics device is able to provide voice call, SMS, and TCP services through the telephone number of the mobile terminal, while the mobile terminal is not able to provide voice call service, but is able to provide SMS and TCP services.

In accordance with another embodiment of the invention, wherein the switching server comprises: an authentication unit performing user authentication by comparing a received authentication number from the telematics device with a pre-stored user authentication information; a switching setting unit performing switching setting or switching cancellation when it receives a request for the setting or cancellation from the telematics device; and a storage unit stores the switching phone list and the user authentication information.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Figure 2:
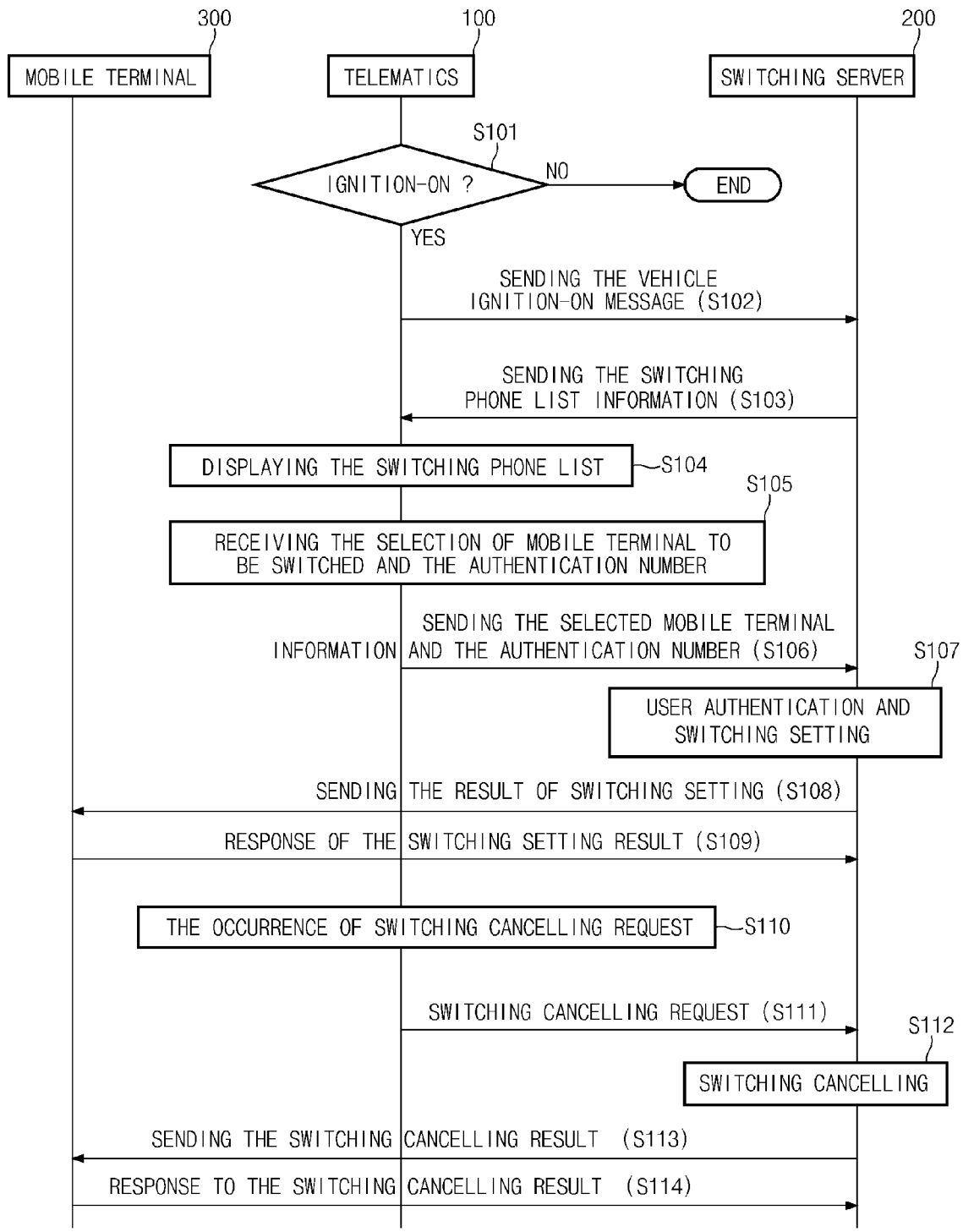
FIG. 2 is a flowchart that shows an operation mode of the system of FIG. 1.
Figure 3:
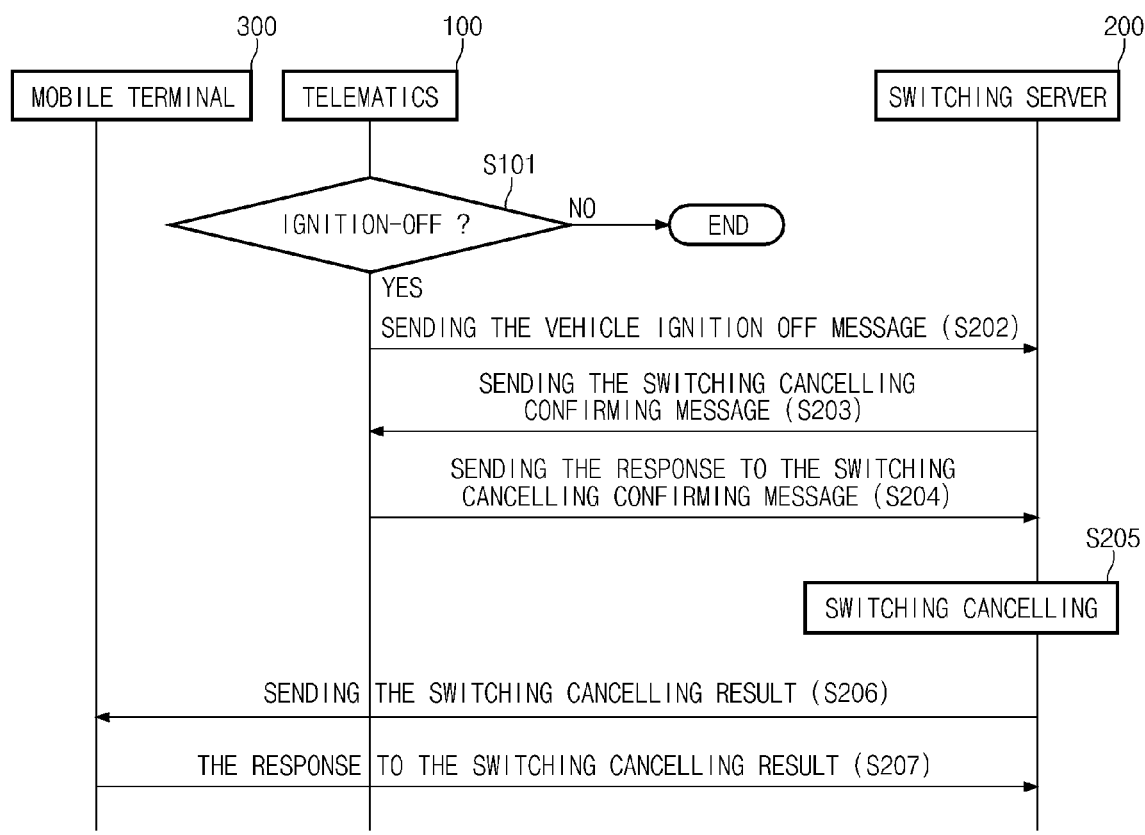
FIG. 3 is another flowchart that shows an operation mode of the system of FIG. 1.

Hereinafter, embodiments of the method for providing telematics communications according to the invention will be described with reference to the attached FIG. 1 to FIG. 3.

Figure 1:
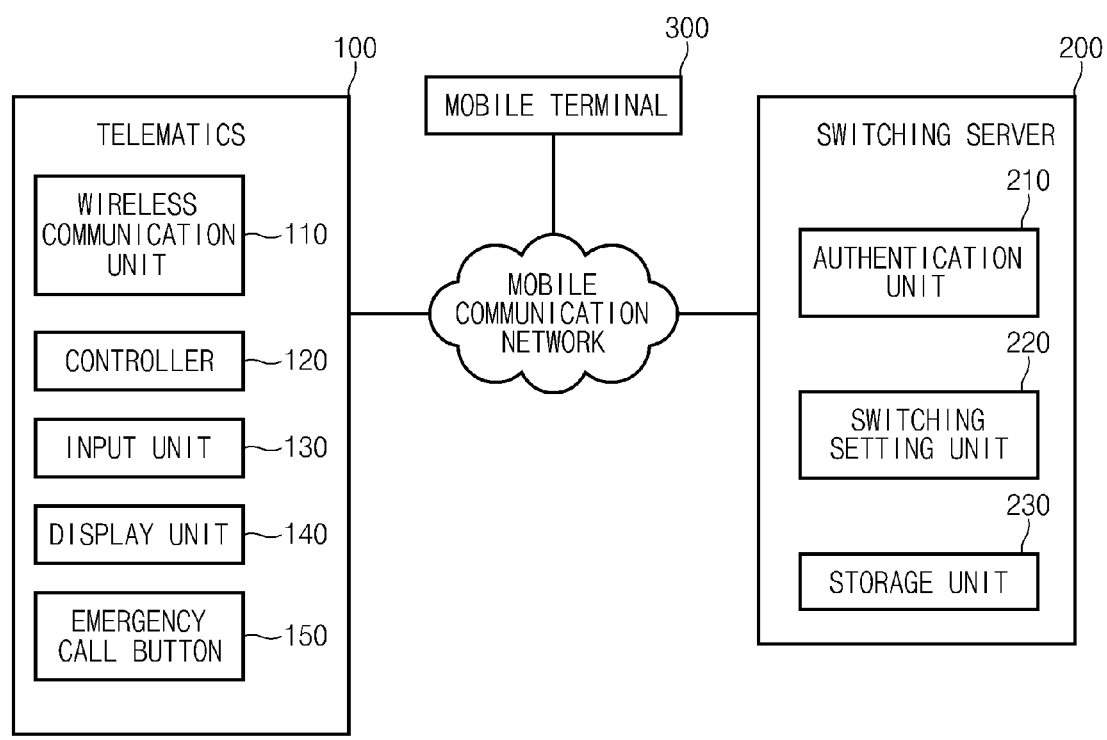
FIG. 1 is a configuration diagram of a system for providing telematics communications according to an embodiment of the invention.

FIG. 1 is a configuration diagram of a system for providing telematics communications according to an embodiment of the invention.

The system may include a telematics device 100, a switching server 200 communicating with the telematics device 100 through a mobile communication network, and a mobile terminal 300 communicating through the mobile communication network.

The telematics device 100 may include a wireless communication unit 110, a controller 120, an input unit 130, a display unit 140 and an emergency call button 150. The wireless communication unit 110 performs a wireless communication with the switching server 200 and telematics information center. The controller 120 control to transmits a message associated with the ignition on/off of a vehicle and an authentication number to the switching server 200.

The input unit 130 receives an authentication number from the driver and receives information about a mobile terminal, selected from a switching phone list, to be switched. The display unit 140 displays the switching phone list. The emergency call button 150 performs an emergency call to a telematics information center (not shown) when it is pressed by the driver in case of the occurrence of an accident.

The switching server 200 may include an authentication unit 210, a switching setting unit 220 and a storage unit 230. In case of receiving the authentication number from the telematics device 100, the authentication unit 210 performs user authentication by comparing the received authentication number with a pre-stored user authentication information in the storage unit 230.

The switching setting unit 220 performs switching setting or switching cancellation when it receives the request for the setting or cancellation from the telematics device 100.

The storage unit 230 stores the switching phone list and the user authentication information.

Hereinafter, operation modes of the system according to an embodiment will be described with reference to FIGS. 2 and 3.

A driver subscribes to a mobile network service for the mobile terminal 300 and the telematics device 100. The mobile network service assigns a number for the mobile terminal 300 and another number for the telematics device 100. The mobile network service provides a supplementary service which allows the driver to switch the numbers for communication.

For instance, in case where the number "011-1111-1111" is given to the mobile terminal 300 and "011-2222-2222" is given to the telematics 100, if the driver sets the switching from the mobile terminal 300 to the telematics device 100 after getting the ignition of the on, telephone calls to the number "011-1111-1111" of the mobile terminal 300 can be received by the telematics device 100. On the other hand, if the driver does not turn on the switching function, the mobile terminal 300 can communicate but the telematics device 100 cannot unless the emergency call button 150 is on. Such emergency call button function may or may not be available depending on the policy of mobile network service providers.

In the meantime, when the ignition is turned off, the switching function is cancelled such that telephone calls to the number "011-1111-1111" is received by the mobile terminal 300 and communication with the telematics device 100 is not available. In this case, depending on the policy of the mobile network service providers, emergency call through the emergency call button 150 may or may not be available.

Hereinafter, with reference to the below table 1 and FIG. 2, the operation of the system will be described in detail. It is noted that as described above, the availability of the services listed in Table 1 and types/kinds of available services may vary depending on the policy of the mobile network service providers.

TABLE 1

| Ignition | Switching | Service | Mobile terminal | Telematics |
| --- | --- | --- | --- | --- |
| Ignition on | Switching setting | Voice call | Impossible | Possible |
| | | SMS | Possible | Possible |
| | | TCP | Possible | Possible |
| Ignition on | Switching cancelling | Voice call | Possible | Impossible (except for emergency) |
| | | SMS | Possible | Impossible (except for emergency) |
| | | TCP | Possible | Impossible (except for emergency) |
| Ignition off | Switching automatic cancelling | Voice call | Possible | Impossible |
| | | SMS | Possible | Impossible |
| | | TCP | Possible | Impossible |

That is, when the ignition of the vehicle is turned on (S101), the telematics device 100 sends the vehicle ignition-on message to the switching server 200 (S102). Then, the switching server 200 sends to the telematics device (100) a switching phone list which includes the number of numbers of mobile terminal or terminals capable of being switched with the number of the telematics device 100 (S103). The telematics device 100 displays the switching phone list (S104) for the driver to select a number from the list and receives information about the selected number (mobile terminal) with an authentication number inputted from the driver (S105).

Thereafter, the telematics device 100 sends the selected mobile terminal information and the authentication number to the switching server 200 (S106).

The switching server 200 performs user authentication based on the authentication number and performs the function of switching from the number of the selected mobile terminal 300 to that of the telematics 100 (S107). Then, the switching server 200 sends the result of the switching setting to the mobile terminal 300 (S108). The mobile terminal 300 sends a response message for the switching setting result to the switching server 200 (S109).

When the switching setting is completed, as shown in Table 1, the telematics device 100 may provide voice call, SMS (short message service), and TCP (transmission control protocol) service received by the mobile terminal 300 while the mobile terminal 300 may not provide voice call service. In this case, it can be designed such that SMS and TCP services may be available for the driver's convenience.

Thereafter, in case of receiving a switching cancellation request from the driver when the ignition is turned on (S110), the telematics device 100 requests switching cancellation to the switching server 200 (S111), and the switching server 200 performs the switching cancellation (S112). Then, the switching server 200 sends the switching cancellation result to the mobile terminal 300(S113), and the mobile terminal 300 sends a response message for the switching cancellation result to the switching server 200 (S114).

As described, when the switching is cancelled in the ignition-on state, as shown in Table 1, the mobile terminal 300 is able to provide voice call, SMS, and TCP services, while the telematics device 100 is not able to provide all the services. In this case, it can be designed such that SMS and TCP services may be available for the driver's convenience.

Hereinafter, with reference to FIG. 3, the method for cancelling the telematics communication switching according to an embodiment of the invention will be described in detail.

When the ignition of the vehicle is turned off (S201), the telematics device 100 sends the vehicle ignition off message to the switching server 200 (S202). At this time, the switching server 200 sends to the telematics device 100 a message that confirms that switching needs to be canceled (S203). The telematics device 100 sends to the switching server 200 a response message for the switching cancellation confirming message (S204), and the switching server 200 performs the switching cancellation (S205). Subsequently, the switching server 200 sends the switching cancellation result to the mobile terminal 300 (S206). The mobile terminal 300 sends to the switching server 200 a response message for the switching cancellation result (S207).

In case the switching is cancelled after the ignition of the vehicle is turned off, as shown in Table 1, the mobile terminal 300 is able to provide voice call, SMS, and TCP services. As the power is turned off in the vehicle ignition-off setting, the telematics device 100 is not able to provide voice call, SMS, and TCP services.

As described above, according to the present methods, since mobile terminal or terminals of a driver (or a passenger) can be switched to the telematics device of a vehicle, subscription to an additional mobile communication network service is not required, thereby being able to reducing the communication fee.

What is claimed is:

1. A method for providing telematics communications, the method comprising:
    sending an ignition-on message from a telematics device to a switching server, when an ignition is turned on;
    sending a switching phone list from the switching server to the telematics device responsive to receipt of the ignition on message; the switching phone list being a predetermined list of mobile terminals;
    sending information of a mobile terminal selected from the switching phone list and an authentication number from the telematics device to the switching server;
    the switching server performing user authentication using the information and authentication number sent to the switching server, and performing switching setting, responsive to a given result of user authentication to allow the telematic device to be switched so as to use a telephone number assigned to the selected mobile terminal;
    in the case where the telematic device is switched so as to use the telephone number assigned to the selected mobile terminal, the telematics device providing a call service received by the telephone number of the selected mobile terminal; and
    in the case where the telematic device is switched so as to use the telephone number assigned to the selected mobile terminal, the switching server sending a switching setting result to the mobile terminal whereby the mobile terminal is not capable of performing the call service.

2. The method of claim 1, wherein, when the switching setting is completed, (a) the telematics device is able to provide voice call, SMS, and TCP services using the telephone number of the mobile terminal, and (b) the mobile terminal is not able to provide voice call service, but is able to provide SMS and TCP services.

3. The method of claim 1, further comprising:
    sending a request from the telematics device the switching server to cancel the switching setting, when the telematics device receives the request from a driver in the ignition-on state; and
    sending a switching cancellation result from the to the mobile terminal, after the switching server cancels the switching setting.

4. The method of claim 3, wherein, when the cancellation of the switching setting is completed, (a) the mobile terminal is thereafter provides voice call, SMS, and TCP services, and (b) the telematics device is not able thereafter to provide voice call, SMS, and TCP services in non-emergency conditions.

5. The method of claim 1, further comprising:
    sending an ignition-off message from the telematics device to the switching server, when the ignition is turned off;
    sending a message from the switching server to the telematics device, the message confirming that the switching setting needs to be canceled and the switching server receiving a response message from the telematics device; and
    canceling the switching setting by the switching server and the switching server sending a switching cancellation result to the mobile terminal, thereby allowing the mobile terminal to thereafter provide the voice call, SMS, and TCP service.

6. The method of claim 1, wherein the switching server generates and saves the predetermined switching phone list and information about the mobile terminal so as to be available before the telematics device sends the ignition-on message to the switching server.

7. The method of claim 1, wherein said sending information of a mobile terminal selected from the switching phone list and an authentication number from the telematics device to the switching server; includes:
    having one of a driver or passenger selecting said information about the mobile terminal from the switching phone list; and
    having said one of the driver or passenger inputting the authentication number for transmission to the switching server.

8. A system for providing telematics communications, the system comprising:
    a telematics device that is configured for a wireless communication with a telematics information center, but is not configured to provide call services during normal operating conditions;

a switching server that is configured to send a switching phone list to the telematics device when an ignition of a vehicle is turned on; to perform a switching setting, responsive to a communication from the telematics device communicating information of a mobile terminal selected from the switching phone list ("selected mobile terminal"), said switching setting allowing the telematics device to be capable of using a telephone number assigned to the selected mobile terminal, and to communicate this switching setting to the telematics device; and, wherein the telematics device, responsive to the communication of the switch setting, thereafter is capable of providing a call service received by the telephone number of the selected mobile terminal.

9. The system of claim 8, wherein the telematics device comprises:

an input unit configured so that an authentication number and the selected mobile terminal from the switching phone list can be inputted thereto; and a wireless communication unit configured to perform wireless communication with the switching server and the telematics information center and to transmit a message associated with one of an ignition being turned on/off of the vehicle and to transmit the authentication number to the switching server.

10. The system of claim 8, wherein, when the switching setting is completed, (a) the telematics device is thereafter able to provide voice call, SMS, and TCP services through the telephone number of the mobile terminal, and (b) the mobile terminal is thereafter not able to provide voice call service, but is able to provide SMS and TCP services.

11. The system of claim 9, wherein the switching server comprises:

an authentication unit that performs authentication by comparing the authentication number transmitted from the telematics device and received by the switching server, with a pre-stored user authentication information;

a switching setting unit that performs one of switching setting or switching cancellation when a request for setting of the switching setting or cancellation of an already set switching setting is transmitted from the telematics device and received by the switching server; and a storage unit stores the switching phone list and the user authentication information.

* * * * *